United States Patent [19]
Folino et al.

[11] Patent Number: 5,832,584
[45] Date of Patent: Nov. 10, 1998

[54] DEVICE FOR CLEANING AND INSPECTING CASTINGS

[75] Inventors: Anthony M. Folino, Vassar; Michael A. Greko, Sr., Saginaw, both of Mich.

[73] Assignee: Grede Foundries, Inc., Milwaukee, Wis.

[21] Appl. No.: 595,273

[22] Filed: Feb. 1, 1996

[51] Int. Cl.$^6$ .................................................. B23Q 17/00
[52] U.S. Cl. .......................................................... 29/407.04
[58] Field of Search ............................. 134/63, 83, 111, 134/183, 134, 85, 133; 29/33 R

[56] References Cited

U.S. PATENT DOCUMENTS

| | | | |
|---|---|---|---|
| 1,117,821 | 11/1914 | Erickson | 134/134 |
| 3,153,419 | 10/1964 | Evans et al. | 134/133 |
| 3,869,830 | 3/1975 | Baker | 51/8 |
| 4,458,155 | 7/1984 | Grunner et al. | 250/572 |
| 4,643,243 | 2/1987 | McKibben et al. | 164/261 |
| 5,187,831 | 2/1993 | French | 15/302 |
| 5,195,276 | 3/1993 | Vennerholm | 15/320 |
| 5,265,629 | 11/1993 | Sajewski | 134/58 |
| 5,368,653 | 11/1994 | Russell | 134/24 |

*Primary Examiner*—Larry I. Schwartz
*Assistant Examiner*—Christopher Goins
*Attorney, Agent, or Firm*—Andrus, Sceales, Starke & Sawall

[57] ABSTRACT

A device and method for cleaning and inspecting castings is provided. A grind and wash station having a grinder for grinding the casting, and a wash assembly for washing the casting is provided. After the grinding and washing, the casting is transported from the grind and wash station to a borescope station. The borescope station includes a borescope for generating an enlarged image of the interior of the casting, and a monitor for displaying the image.

11 Claims, 6 Drawing Sheets

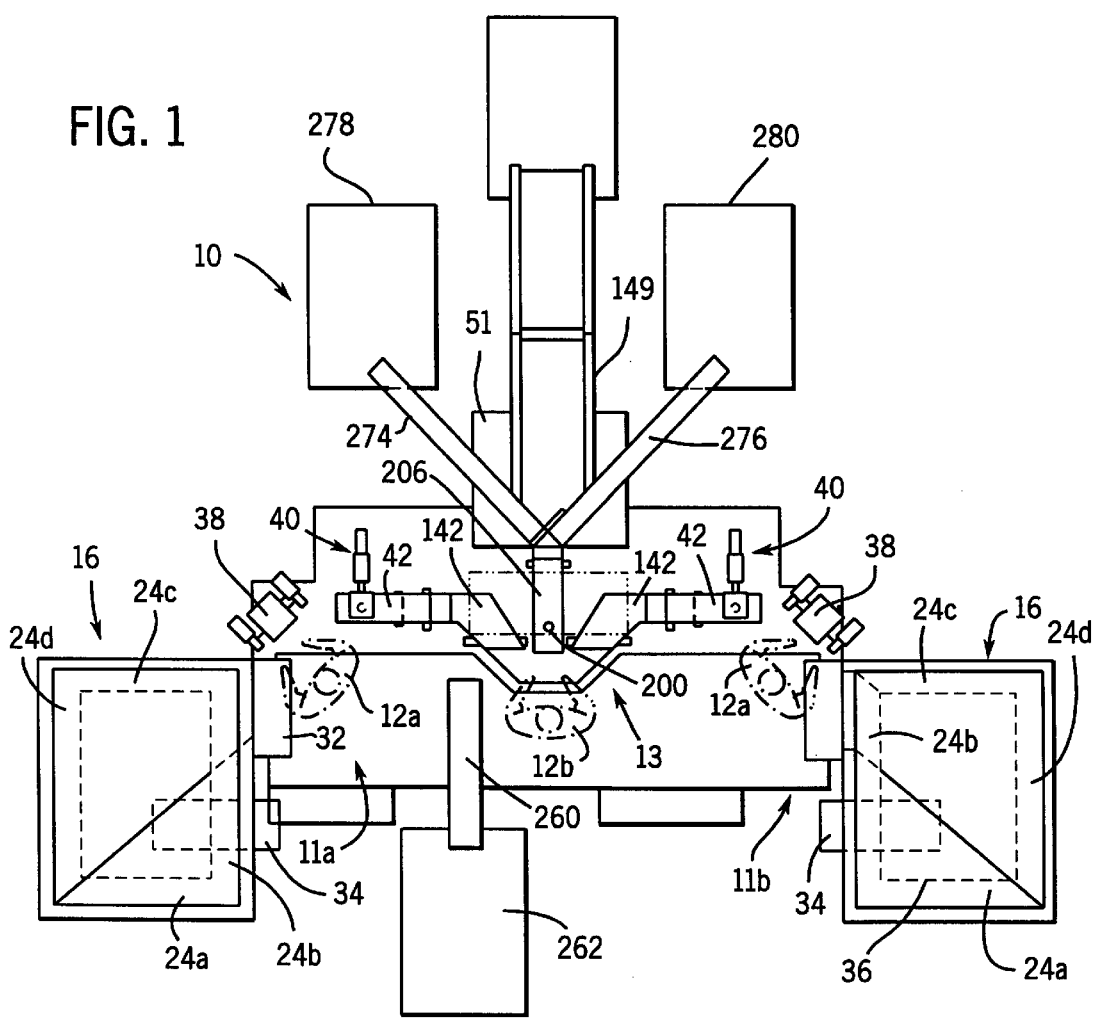
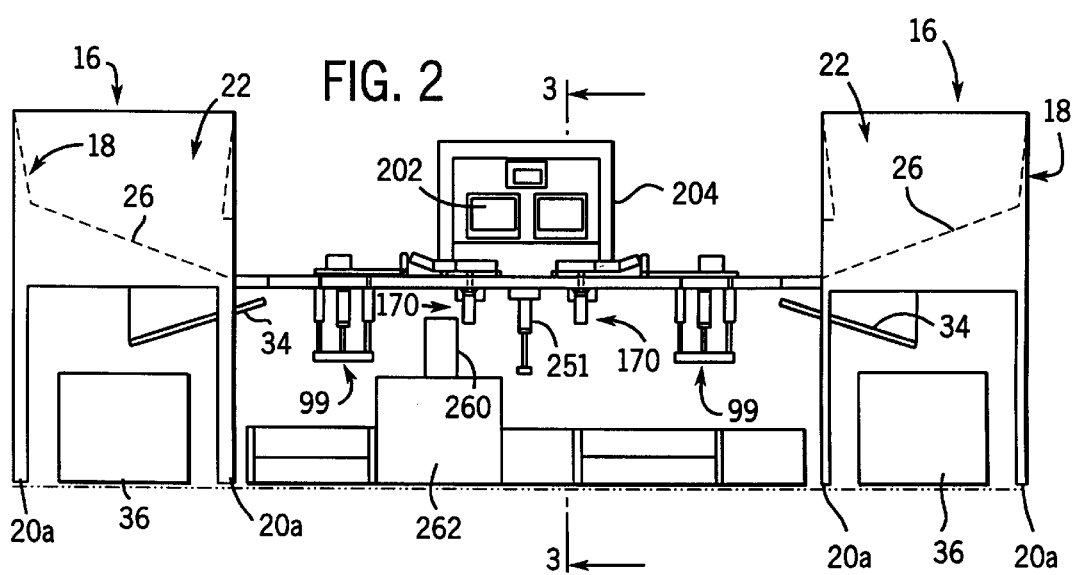

DEVICE FOR CLEANING AND INSPECTING CASTINGS

BACKGROUND AND SUMMARY OF THE INVENTION

The present invention relates to castings, and in particular, to a device and a method for cleaning and inspecting castings.

As is known, castings, such as power steering pump body castings, are formed by pouring molten metal into a mold of sand. After the metal hardens, the sand is removed leaving the finished, cast item.

It is not unusual for the item cast to have excess metal formed along the edges thereof. This excess metal must be removed, by a grinder or the like, in order for the cast item to be used for its intended purpose. For example, an item such as a power steering pump body casting must be of a predetermined configuration so as to form a mating relationship with its corresponding power steering pump body cover.

Further, a casting which is removed from a sand mold often times contains residual sand or the like thereon. Depending upon the environment in which the casting is utilized, the residual sand may interfere with the performance of the cast item. For example, excess sand in the power steering pump body casting may mix with the power steering fluid in an automobile causing damage to the power steering pump. Hence, it is highly desirable to thoroughly remove all residual sand from the casting.

Finally, sand castings often times contain flaws which may or may not be visually detected with the naked eye. These flaws may lead to poor performance of the cast item when subjected to its environment of use. For example, a power steering pump body casting may fail when subjected to the temperature extremes under the hood of an automobile, or to the heat and/or pressure of the power steering fluid, and/or the operation of the power steering pump. As such, it is highly desirable to visually inspect castings not only with the ordinary eye, but also with a magnified display.

Heretofore, the grinding, washing, and inspection of castings has occurred in different locales throughout a foundry. This separation of steps hinders productivity and reduces efficiency by requiring workers to transport castings to different locals throughout the foundry to perform one of the above-identified steps.

The separation of steps causes an increase in the amount of time required between the molding of the casting, and the time at which the casting is actually shipped to a customer. Further, additional delays in production may occur if an inadequate supply of castings are available to a worker at one of the different locales in the foundry. Finally, having the grinding, washing and inspection of the castings at different locales throughout the foundry requires personnel at each locale to perform the functions, and requires personnel to transport the castings therebetween which, in turn, increases the cost to produce each casting.

Therefore, it is a primary object and feature of the present invention to provide a device for cleaning and inspecting castings at a single locale in a foundry.

It is a further object and feature of the present invention to provide a device for cleaning and inspecting castings which may be used to detect microscopic flaws therein.

It is a still further object and feature of the present invention to provide a device for cleaning and inspecting castings which reduces the time required for the grinding, washing and inspection of the castings.

It is a still further object and feature of the present invention to provide a method for cleaning and inspecting castings which may be performed at a single locale in a foundry.

In accordance with the present invention, a device for cleaning and inspecting a casting is provided. The device includes a grind and wash station having a grinder for grinding the casting, and a wash assembly for washing the casting. A borescope station is provided and includes a borescope for generating an enlarged image of the castings and a monitor for displaying the image. Means are provided for transporting the casting of the grind and wash station to the borescope station.

The grinder, the wash assembly and the borescope are supported by a single support table which, in turn, allows the device to be operated by as few as two operators.

The method of the present invention includes providing a grind and wash station. The grind and wash station includes a grinder for grinding the casting, and a wash assembly for washing the castings. The method includes the further steps of providing a borescope station adjacent to the grind and wash station. The borescope station including a borescope for generating an enlarged image of the casting, and a monitor for displaying the image.

The casting is ground to a predetermined configuration with the grinder, and washed with the wash assembly. After washing, the casting is transported from the grind and wash station to the borescope station. An enlarged image of the casting is generated with the borescope, and the image is displayed on a monitor. A borescope station operator inspects the image of the casting.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a top plan view of the device for cleaning and inspecting castings in accordance with the present invention;

FIG. 2 is a front elevation view of the device of FIG. 1;

DETAILED DESCRIPTION OF THE PREFERRED EMBODIMENT

Figure 3:
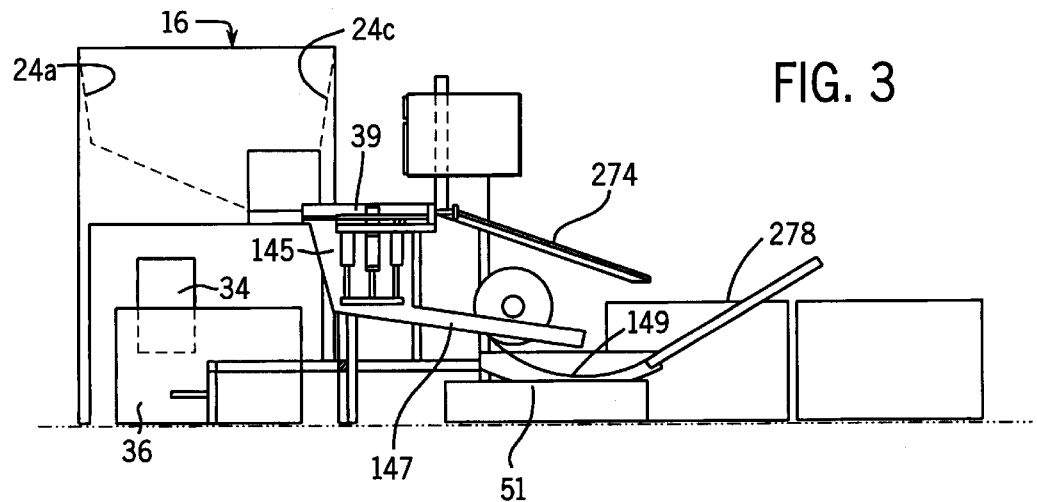
FIG. 3 is a cross-sectional view of the device of FIG. 2 taken along line 3—3.

Referring to FIG. 1, a device for cleaning and inspecting castings is generally designated by the reference number 10. Device 10 is designed for the cleaning and inspecting of castings, 14, FIG. 4, such as power steering pump body castings and includes first and second grind and wash stations, 11a and 11b, each manned by a grind and wash station operator 12a, and a borescope inspection station manned by a borescope station operator 12b.

After being cast, castings 14 are placed in a feeder hopper 16 located adjacent each grind and wash station 11a and 11b. Each feeder hopper 16 includes a hopper portion 18 supported by a plurality of legs 20a. Hopper portion 18 includes a cavity 22 defined by sloping sidewalls 24a–24d which are directed toward a inclined bottom surface 26. A ramp extends from bottom surface 26 through sidewall 24b in feeder hopper 16 thereby directing casting 14 toward a table 32. The structure of feed hopper 16 allows for the continuous supply of castings 14 within reach for each operator 12a, at each grind and wash stations 11a and 11b, respectively.

At stations 11a and 11b, each operator 12a may visually inspect each casting 14. Each rejected castings 33, may be immediately discarded onto a scrap chute 34 which is directed toward the interior of a scrap bin 36. This, in turn, allows each operator 12a to immediately discard flawed or miscast castings 14.

Each grind wash station 11a and 11b includes a conventional grinder 38 mounted to a support table 39 which allows each operator 12a to grind and/or to remove any burrs or flash on casting 14, as is conventional, and a wash assembly 40 mounted above support table 39 to remove loose sand or residue on the casting 14. Wash assembly 40 includes a generally, rectangular support surface 42 for receiving casting 14 thereon. A fluid dispensing tube 44 extends through an opening 43 in support surface 42, and has a first end interconnected to a fluid source 51 and a second spray end 46.

Figure 4:
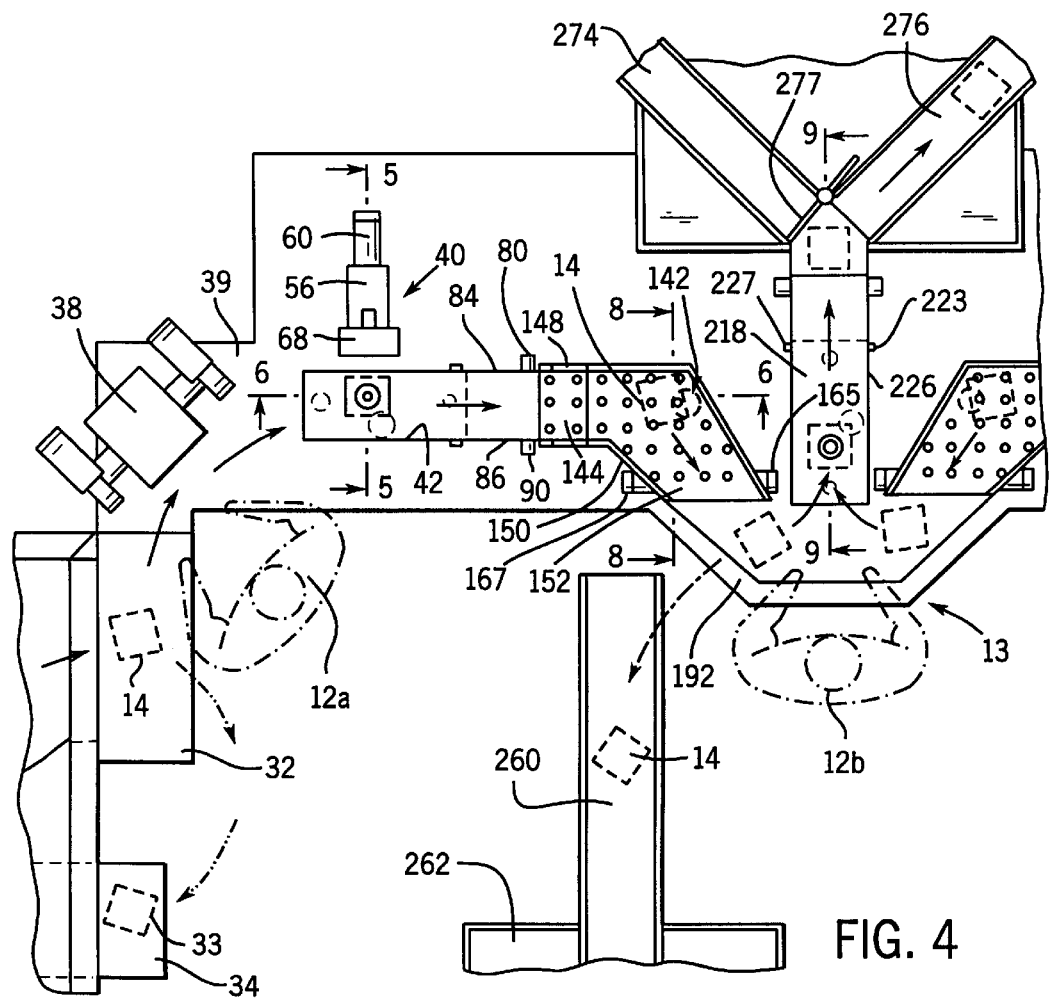
FIG. 4 is an enlarged top plan view showing a portion of the device of FIG. 1.
Figure 5:
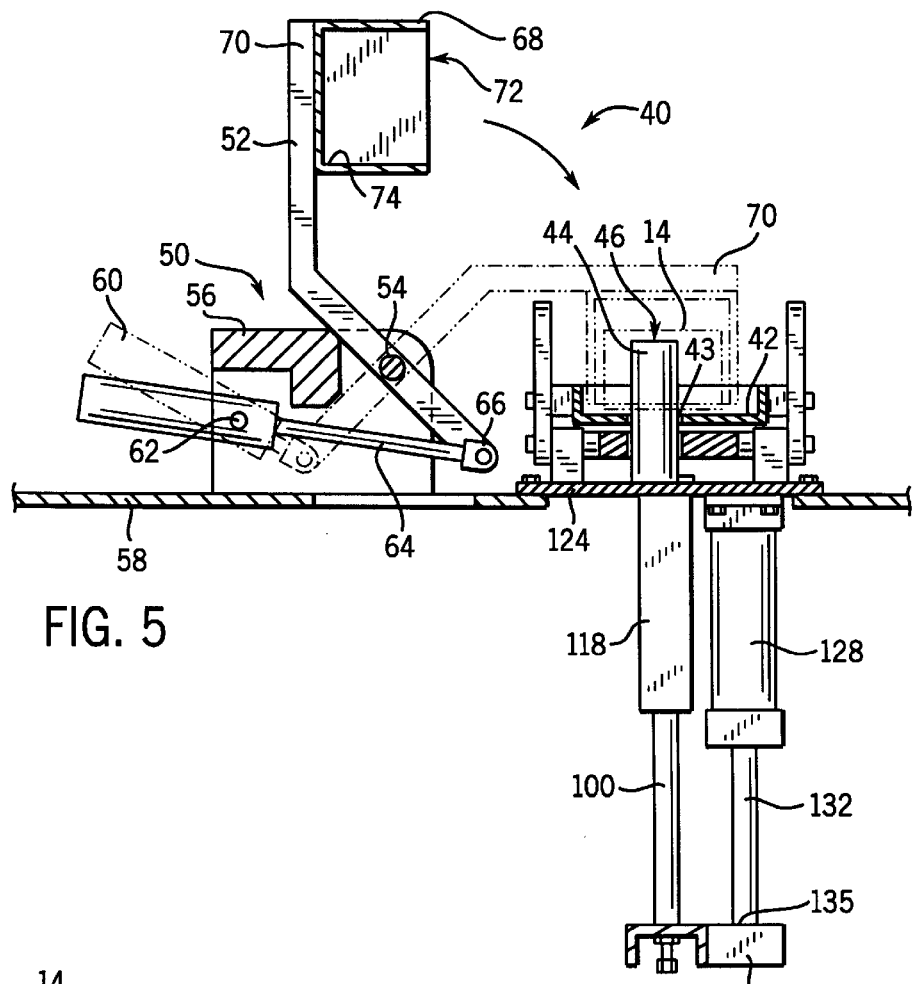
FIG. 5 is a cross-sectional view of the device of FIG. 4 taken along 5—5.
Figure 6:
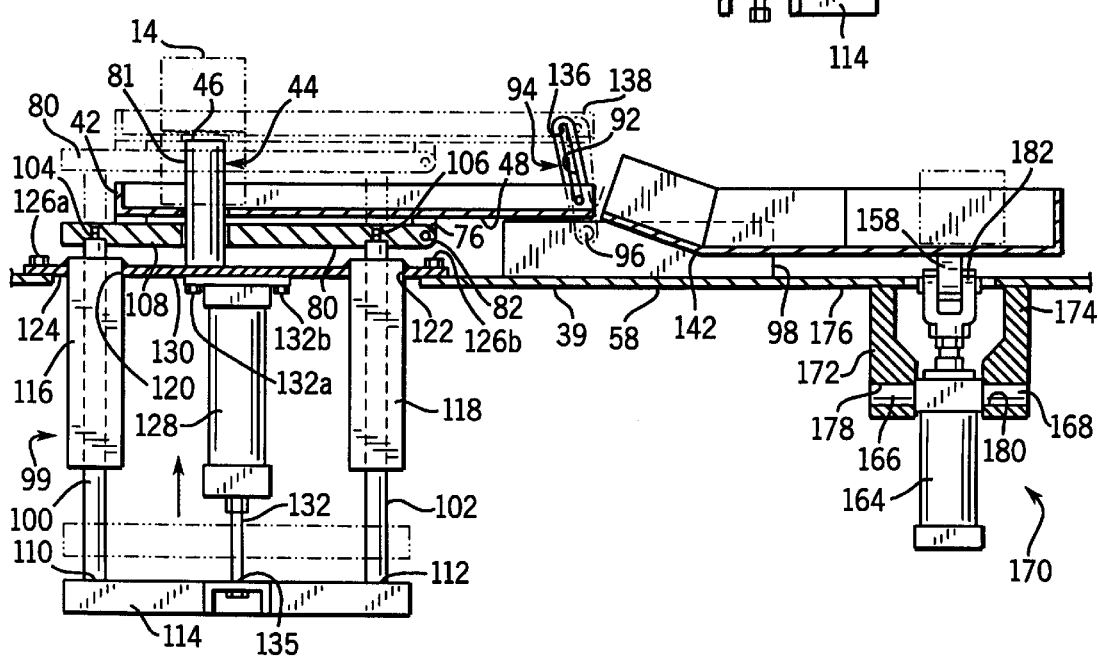
FIG. 6 is a cross-sectional view of the device of FIG. 4 taken along line 6—6 showing a support surface in a lowered position.

Referring to FIGS. 4–6, wash assembly 40 further includes an arm 52 pivotally mounted at pivot point 54 to a support bracket 56 extending from support table 39. A pneumatic actuator 60 is also pivotally mounted to support bracket 56 at pivot point 62. Pneumatic actuator 60 includes a shaft 64 pivotally mounted to a first end 66 of arm 52. A shroud or wash cover 68 defining a casting wash cavity 74 therein, is mounted to the second end 70 of arm 52. Wash cover 68 is a generally cubic structure with an opening 72 therein to permit entry of castings 14 into wash cavity 74 as hereinafter described.

In operation, each operator 12a places castings 14 over spray end 46 of tube 44 such that the tube 44 extends partially into a cavity (not shown) formed in casting 14, FIG. 5. Shaft 64 on pneumatic actuator 60 is retracted so as to pivot second end 70 of arm 52 about pivot point 54 such that casting 14 is received within a casting wash cavity 74 in wash cover 68. A water based, rust preventive solution is drawn from the fluid source 51, by a pump or the like, and injected through spray end 46 of tube 44 into the interior cavity of casting 14 in order to remove loose sand or other residue on casting 14 from the foundry process. Wash cover 68 prevents the undesired spraying of rust preventive solution about each of the grind and wash stations 11a and 11b. In addition, end 70 of arm 52 maintains casting 14 about tube 44 and prevents casting 14 from freely flying off spray end 46 of tube 44 in response to injection of the high pressure solution. After the high pressure wash cycle of casting 14 is completed, shaft 64 of pneumatic actuator 60 is extended so as to pivot end 70 of arm 52 about pivot point 54 away from tube 44.

Each support surface 42 includes an ear 76 which depends from the bottom surface 78 thereof. Ear 76 is pivotally mounted to a vertically movable horizontal platform 80 at pivot point 82. Support surface 42 further includes a pair of vertically extending sidewalls 84 and 86 each having a pin 88 and 90, respectively, FIG. 4, extending laterally therefrom. Each pin 88 and 90 is; adapted for receipt within a slot 92 of a slotted, elongated pivot bar 94 which is pivotally mounted at pivot point 96 to a base member 98 secured to support table 39.

As best seen in FIG. 6, horizontal platform 80 is interconnected to support table 39 by a support assembly 99. An opening 81 is provided in horizontal platform 80 which is axially aligned with opening 43 in support surface 42 in order to accommodate tube 44 therethrough. Support assembly 99 includes first and second support rods, 100 and 102. Each support rod 100 and 102 has a first threaded end 104 and 106 which is threaded into the underside 108 of horizontal platform 80, and a second end 110 and 112, respectively, which is secured to a second vertically movable, horizontal platform 114. Each support rod 100 and 102 extends through a distinct, tubular, generally cylindrical guide member 116 and 118, respectively, which, in turn, is secured in a distinct opening 120 and 122 formed in plate 124. Plate 124 is secured to support table 39 by a plurality of bolts 126a–126b or the like.

A pneumatic actuator 128 is mounted to the underside 130 of plate 122 by bolts 132a and 132b or the like and includes a shaft 132 having a first end 135 interconnected to second horizontal platform 114. Shaft 132 is movable between a first, retracted position and a second, extended position.

Figure 7:
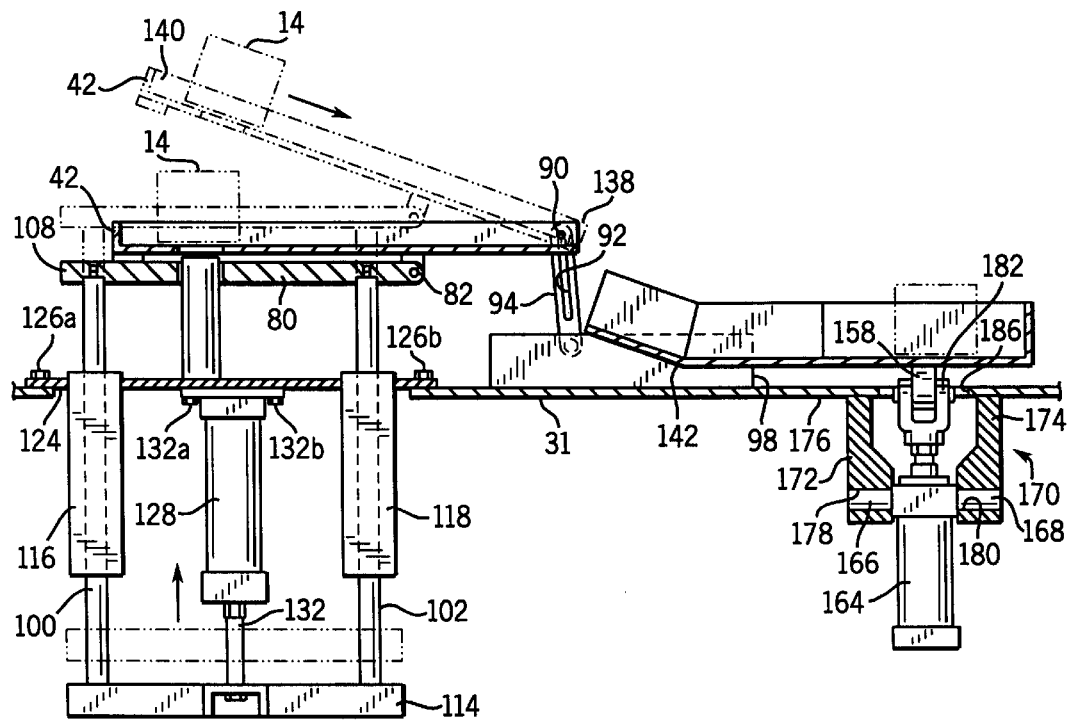
FIG. 7 is a cross-sectional view of the device of FIG. 6 showing the support surface in an extended position.

In operation, with shaft 132 in the extended position as shown in FIG. 6, spray end 46 of tube 44 extends through support surface 42 so as to allow casting 14 to be placed thereabout, as previously described. After a wash cycle is completed, shaft 132 is retracted thereby raising second horizontal platform 114 which, in turn, covers support rods 100 and 102 to raise first horizontal support table 80, as best seen in FIG. 7. Horizontal platform 80, in turn, raises support surface 42 such that each pin 88 and 90 follows slot 92 in corresponding pivot rods 94. In addition, as horizontal platform 80, and, in turn, support surface 42 is raised, support surface 42 engages and lifts casting 14 from about the spray end 46 of tube 44 so as to allow lateral movement of casting 14 about support surface 42.

As horizontal platform 108 and, in turn, support surface 42 is raised, support surface 42 engages and lifts casting 14 from about the spray end 46 of tube 44 so as to allow lateral movement of casting 14 about support surface 42.

As each pin 88 and 90 engages the upper, closed end 136 of corresponding pivotal rod 94, closed end 136 of pivotal rod 94 maintains the position of pins 88 and 90 so as to prevent the first end 138 of support surface 42 from continuing to be raised. Thereafter, as horizontal platform 108 continues to be raised by shaft 132 of pneumatic actuator 128, support surface 42 begins to pivot about pivot point 82 thereby tilting support surface downwardly from the second end 140 to the first end 138 of support surface 42. By tilting support surface 42, casting 14 slides downwardly along the support surface 42 onto a part drainage platform 142. Shaft 132 then returns to its original extended position causing support surface 42 to return in its original horizontal position in order to accommodate another casting 14.

Figure 8:
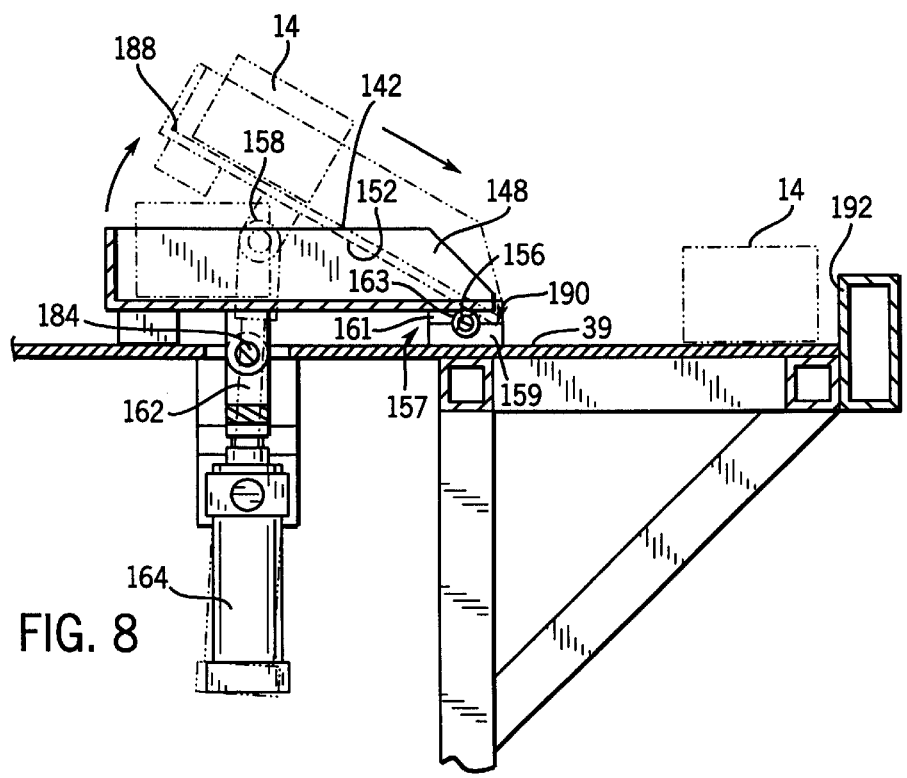
FIG. 8 is a cross-sectional view of the device of FIG. 4 taken along 8—8.

As best seen in FIG. 4, part drainage platform 142 includes a plurality of openings 144 therethrough to allow excess rust preventive solution to drain off the washed castings 14, and also includes first 148 and second 150 sidewalls, FIG. 8, to maintain castings 14 on part drainage platform 142. Referring to FIG. 3, used solution drains through openings 144 in part drainage platform 142 into basin 145 mounted to the underside of support table 39. A downwardly sloping gutter 147 provides flow path for the solution and deposited the fluid over a filter 149. Solution flows through filter 149, thereby cleaning the solution, and into fluid storage tank 51 in order to be reused.

The underside 152 of platform 142 is mounted on roller 156 which pivots in a gimbal 157. Gimbal is constructed from a first base portion 159 having a first underside secured to support table 39 and a second, opposite side 161 having a recessed channel 163 therein for receiving roller 156. First and second upper gimbal portions 165 and 167 are secured to opposite ends of base portion 159 to maintain roller 156 in recesses channel 163 and operate as devises. Each upper gimbal portion 165 and 167 also includes a recessed channel 169 to accommodate roller 156.

Referring to FIGS. 6–8, an ear 158 depends from the underside 152 of part drainage platform 142 and is pivotally mounted to a shaft 162 of a pneumatic actuator 164. Shaft 162 includes a yoke 182 which, in turn, is pivotally mounted to ear 158 by pin 184. Actuator 164 includes first and second cylindrical pins 166, 168 which extend laterally from pneumatic actuator 164. A gimbal 170 is formed by a first clevis 172 and a second clevis 174 which depend from the underside 176 of support table 39 and include a cylindrical pin receipt aperture 178 and 180, respectively, therein. Each cylindrical pin receipt aperture 178 and 180 is adapted for receiving a corresponding cylindrical pin 166 and 168, respectively, therein, so as to allow pneumatic actuator 164 to pivot on cylindrical pins 166 and 168.

In operation, as previously described, castings 14 are deposited on each part drainage platform 142 from each grind and wash station 11a and 11b. As hereinafter described, in order to transport castings 14 from the part drainage platform 142 toward borescope station 13, part drainage platform 142 is tilted such that castings 14 slide downwardly onto support table 39.

When receiving casting 14 from support surface 42, shaft 162 is retracted such that part drainage platform 142 is generally horizontal, FIG. 7. After part drainage platform 142 receives a predetermined. number of castings 14 thereon, shaft 162 in pneumatic actuator 64 is extended through opening 186 in support table 39 such that the second end 188 of part drainage platform 142 is raised while the second end 190 of part drainage platform 142 pivots in gimbal 57, thereby tilting part drainage platform 142 downwardly from the second end 188 to the first end 190. As best seen in FIG. 8, by tilting part drainage platform 142, castings 14 slides downwardly on part drainage platform 142 onto support table 39. A stop 192 is formed along the peripheral edge of support table 39 to maintain casting 14 thereon. With castings 14 on support table 39, each casting 14 is within easy reach of borescope operator 12b at borescope station 13.

Figure 9:
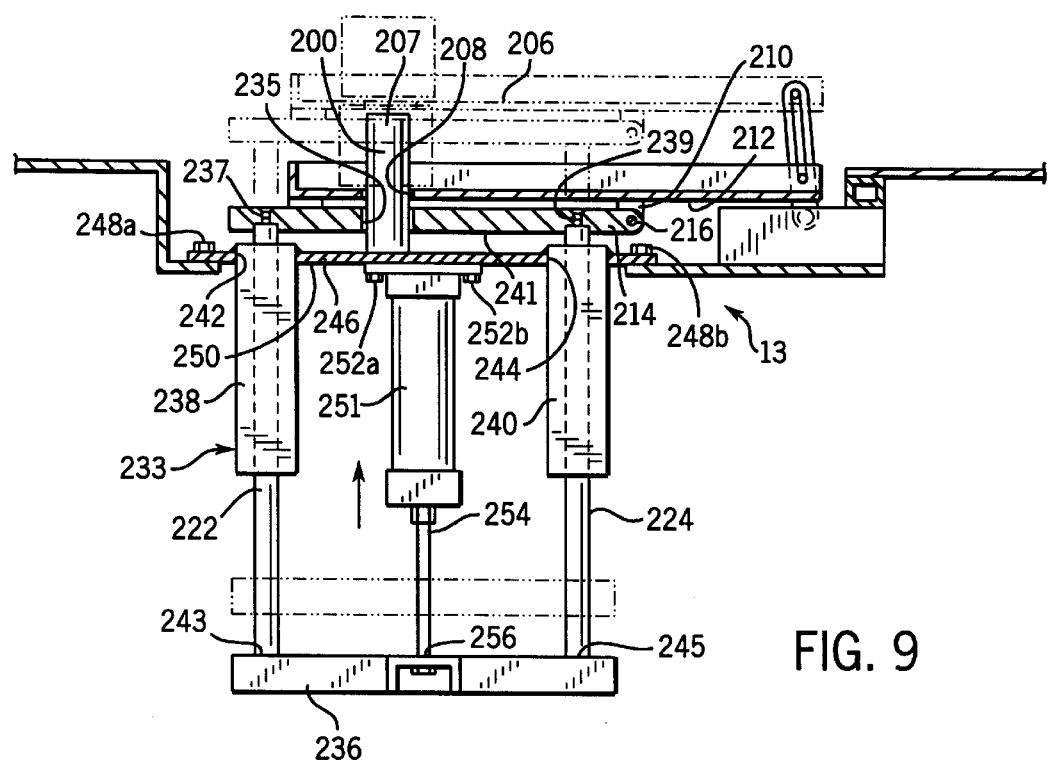
FIG. 9 is a cross-sectional view of the device of FIG. 4 taken along 9—9 showing a second support surface in a lowered position.
Figure 10:
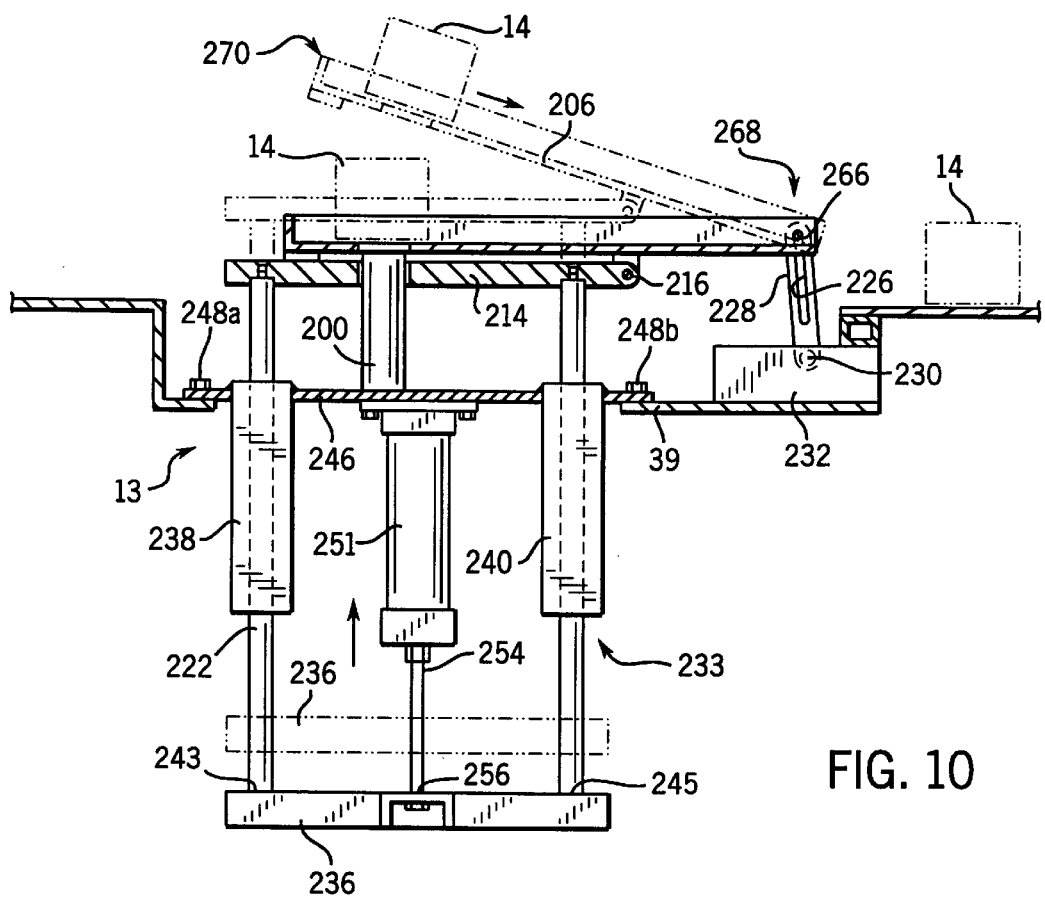
FIG. 10 is a cross-sectional view of the device of FIG. 9 showing the second support surface in an elevated position.

As best seen in FIGS. 9–10, borescope station 13 includes a borescope 200 which allows operator 12b to view an engaged image of the interior cavity of casting 14 on monitors 202 and 204 to detect flawed or miscast castings 14. Referring to FIG. 9, borescope station 13 includes a generally, rectangular support surface 206 for receiving casting 14 thereon. A first end 207 of borescope 200 extends through an opening 208 in support surface 206. Borescope 200 is interconnected to a power source (not shown) and to monitors 202 and 204, for viewing the interior of casting 14, for reasons previously described.

An ear 210 depends from the bottom surface 212 of support surface 206. Ear 210 is pivotally mounted to a vertically movable horizontal platform 214 at pivot point 216. Support surface 206 further includes a pair of vertically extending sidewalls 218 and 220, FIG. 4, each having a pin 221 and 223, respectively, extending laterally therefrom. Each pin 221 and 223 is adapted for receipt within a slot 226 of a slotted elongated pivot bar 228 which is pivotally mounted at pivot point 230 to a base member 232 secured to support table 39.

Horizontal platform 214 is interconnected to support table 39 by a support assembly 233. An opening 235 is provided in a horizontal platform 214 which is axially aligned with opening 208 in support surface 206 in order to accommodate borescope 200 therethrough. Support assembly 233 includes first and second support rods 222 and 224. Each support rod 222 and 224 has a threaded first end 237 and 239, respectively, which is threaded into the underside 241 of horizontal platform 214, and a second end 243 and 245, respectively, which is secured to a second vertically movable, horizontal platform 236. Each support rod 222 and 224 extends through a distinct, tubular, generally cylindrical guide member 238 and 240, respectively, which, in turn, is secured in distinct opening 242 and 244 formed in plate 246. Plate 246 is secured to support table 39 by a plurality of bolts 248a–248b or the like.

A pneumatic actuator 251 is mounted to the underside 250 of plate 246 by bolts 252a and 252b or the like, and includes a shaft 254 having a first end 256 interconnected to second horizontal platform 236. Shaft 254 is movable between a first retracted position and a second, extended position.

In operation, with shaft 254 in the extended position, as shown in FIG. 9, borescope 200 extends through support surface 206 so as to allow casting 14 to be placed thereabout. With casting 14 positioned about borescope 200, operator 12b visually inspects the interior cavity of casting 14 by viewing enlarged images of the interior cavity on monitors 202 and 204. If operator 12b determines that casting 14 has a flaw or has been miscast, operator 12b removes casting 14 from above borescope 200 and deposits casting 14 on scrap chute 260 which directs the casting 14 to the interior of a scrap bin 262.

If, on the other hand, casting 14 is approved by operator 12b after visually inspection with borescope 200, shaft 254 is retracted, thereby raising second horizontal platform 236 which, in turn, causes support rods 222 and 224 to raise first horizontal platform 214, as seen in FIGS. 9–10. Horizontal platform 214, in turn, raises support surface 42 such that each pin 221 and 223 follows slot 226 and corresponding pivot rod 228. In addition, horizontal platform 214 and, in turn, support surface 206, is raised, support surface 206 engages and lifts casting 14 from about borescope 200 so as to allow lateral movement of casting 14 about support surface 206.

As each pin 221 and 223 engages the upper closed end 226 of pivot rod 228, closed end 226 of pivot rod 228 maintains the position of pins 221 and 223 so as to prevent the first end 268 of support surface 206 from continuing to be raised. Thereafter, as horizontal platform 214 continues to be raised by shaft 254 of pneumatic actuator 251, support surface 206 begins to pivot about pivot point 216 thereby tilting support surface downwardly from the second end 270 to the first end 268 of support surface 206.

By tilting support surface 206, casting 14 slides downwardly along the support surface 206 onto a predetermined conveyor belt 274 or 276. A hinged access door 277 is provided and is movable between a first position, shown in FIG. 4, which directs casting 14 onto conveyor belt 276 and denies access to conveyor belt 274, and a second position which allows access to conveyor to conveyor belt 274 and prevents access to conveyor belt 276. Each conveyor belt transports casting 14 into a corresponding storage bin 278 and 280 respectively, from which casting 14 is packaged, shipped or the like.

Figure 11:
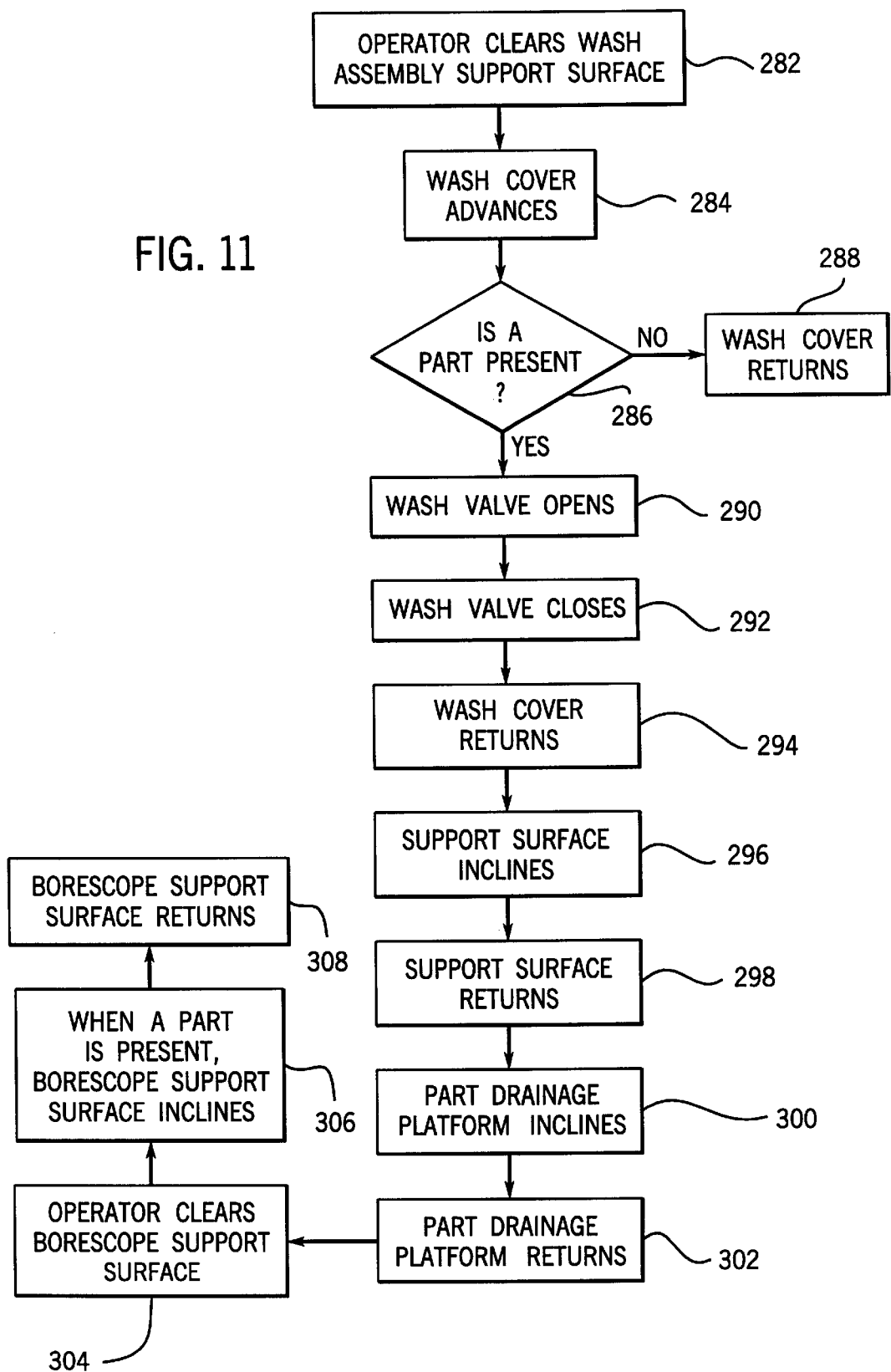
FIG. 11 is a flow chart in accordance with the method of the present invention for cleaning and inspecting castings.

Referring to FIG. 11, the operation of the device 10 of the present invention is controlled by a microprocessor. The processor is programmed to execute the method of this invention upon an operator's command according to the functional blocks shown in FIG. 11, representing program steps.

After operator 12a places a casting 14 on support surface 42 about fluid dispensing tube 44, the operator removes his hands to clear the support surface. A sensor or the like signified by function block 282 signals the microprocessor which, in turn, retracts pneumatic actuator 60 causing wash cover 68 to pivot over casting 14. This step is signified by function block 284.

If a part is not present 286, shaft 64 on pneumatic actuator 60 is extended so as to return wash cover 68 to its original position 288. If, on the other hand, a casting is present on support surface 42, a wash valve is opened 290 and rust preventive solution is injected through spray end 46 of tube 44 into the interior casting 14. After a predetermined time period, the wash valve is closed 292 so as to stop the injection of rust preventive solution into the interior cavity of casting 14.

After the wash valve is closed 292, shaft 64 and pneumatic actuator 60 is extended so as to return wash cover to its original position 294. Thereafter, as signified by function block 296, shaft 132 of pneumatic actuator 128 is retracted so as to incline support surface 42. As previously described, by inclining support surface 42, casting 14 is deposited onto part drainage platform 142. After a predetermined time period, shaft 132 is extended thereby returning support surface 42 to its original, lowered position 298.

After a predetermined time period in order to allow excess rust preventive solution to drain off casting 14, shaft 162 of pneumatic actuator 164 is extended so as to incline part drainage platform 142, represented by function block 300. By inclining a part drainage platform 142, casting 14 is deposited on support table 39 as previously described. After a predetermined time period, shaft 162 is retracted such that part drainage platform 142 returns to its original position 302.

Thereafter, borescope operator 12b places casing 14 about borescope 200. If, after inspecting the interior cavity of casting 14 on monitors 202 and 204, the operator approves of casting 14, the operator removes his hands and clears the borescope support surface 206, which represented by function block 304.

If the operator 12b has not remove casting 14 for being flawed, shaft 254 of pneumatic actuator 251 is retracted so as to incline the borescope support surface 206 as represented by function block 306. By inclining support surface 306, casting 14 is deposited on a predetermined conveyor belt 274 or 276. After a predetermined time period, shaft 254 of pneumatic actuator 251 is extended so as to return borescope support surface 206 to its original, horizontal position 308. The method of FIG. 11 is repeated as each casting 14 is placed on support surface 42 of wash assembly 40.

Various modes of carrying out the invention are contemplated as being within the scope of the following claims particularly pointing out and distinctly claiming the subject matter which is regarded as the invention.

We claim:

1. A device for cleaning and inspecting a casting having a cavity formed therein, comprising:
    a grind and wash station mounted on a supporting surface and including a grinder for grinding the casting, and a wash assembly for washing the casting, the wash assembly comprising:
        a casting support surface for receiving the casting thereon;
        a tube extendable through an opening in the casting support surface, the tube having a first end operatively connected to a fluid source having cleaning fluid therein and a second spray end for spraying the cleaning fluid therethrough; and
        a casting wash cover defining a casting receipt cavity therein, the casting wash cover being pivotable between a first non-wash position wherein the casting is positioned outside of the casting receipt cavity of the casting wash cover and a second wash position wherein the casting is received within the casting receipt cavity of the casting wash cover, such that when the casting is placed on the casting support surface and the spray end of the tube is received in the cavity of the casting, the casting wash cover is pivoted from the first non-wash position to the second wash position and fluid is sprayed from the spray end of the tube so as to wash the casting, wherein the casting support surface is movable between a first lowered, horizontal position wherein the spray end of the tube extends through the opening in the casting support surface, and a second, inclined, elevated position wherein the casting support surface slopes downwardly such that the washed casting slides off the casting support surface;
    a borescope station mounted to the supporting surface including a borescope for generating an enlarged image of the casting, and a monitor for displaying the image; and
    means for transporting the casting from the grind and wash station to the borescope station;
    wherein the grinder, the wash assembly, and the borescope are supported by a support table.

2. The device of claim 1 wherein the means for transporting the casting includes a part drainage platform supported by the support table and positioned between the grind and wash station and the borescope station, the part drainage platform having first and second edges and being movable between a first, lowered position for receiving the washed castings thereon, and a second, inclined position wherein the castings thereon are directed toward the borescope station.

3. The device of claim 2 wherein the part drainage platform includes a plurality of openings in order to accommodate the flow of sprayed fluid therethrough.

4. The device of claim 3 further comprising a basin supported by the support table for receiving sprayed fluid passing through the openings in the part drainage platform and collecting the same; and
    a gutter extending from the basin to the fluid source for providing a flow path thereto.

5. The device of claim 4 further comprising a filter supported by the support table and positioned between the gutter and the fluid source such that the sprayed fluid flowing from the basin to the fluid source passes therethrough, the filter filtering the sprayed fluid and providing same as clean fluid in the fluid source.

6. The device of claim 2 wherein the borescope station comprises:
   a borescope casting support surface for receiving the washed casting thereon, the borescope casting support surface including an opening therein for allowing the borescope to extend therethrough such that the casting may be placed on the borescope casting support surface and the borescope partially received within the interior cavity of the casting.

7. The device of claim 6 further comprising a means for conveying the casting from the borescope station to a storage bin.

8. The device of claim 7 wherein the borescope casting support surface is movable between a first lowered, horizontal position wherein the borescope extends through the opening in the borescope casting support surface, and a second, inclined, elevated position wherein the borescope casting support surface slopes downwardly so as to transport the casting onto the conveying means.

9. A cleaning and inspection station for a casting comprising:
   a grinding element for removal of excess material from the casting, the grinding element supported by a supporting surface;
   a holding bin interconnected to the supporting surface and including a bottom and four sidewalls forming a generally box-like structure, the bin having an opening adjacent to the bottom and a ramp extending outwardly from the opening toward the grinding element;
   a borescope adjacent the grinding element and supported by the supporting surface for generating an enlarged image of the casting;
   a cleaning structure positioned between the grinding element and borescope for cleaning the casting after removal of the excess materials therefrom, the cleaning structure including:
      a casting support surface for receiving the casting thereon;
      a tube extendible through an opening in the casting support surface, the tube having a first end operatively connected to a fluid source having cleaning fluid therein and a second spray end for spraying the cleaning fluid therethrough;
      a casting wash cover having a casting receipt cavity therein, the wash cover pivotal between the first non-wash position and a second wash position wherein the casting is received within the cavity in the wash cover;
   wherein the casting support surface is movable between a first lowered, horizontal position, wherein the spray end of the tube extends through the opening in the casting support surface, and a second, inclined, elevated position wherein the casting support surface slopes downwardly toward the borescope,
   a monitor operatively connected to the borescope for displaying the image; and
   means for selectively conveying the casting to one of the first approved bin and a second rejection bin.

10. The device of claim 9 further comprising a means for transferring the casting from the cleaning structure to the borescope, the means for transporting the casting including a part drainage platform, the part drainage platform having first and second edges and movable between a first, lowered position, and a second, inclined position wherein the castings are directed toward the borescope.

11. The device of claim 10 wherein the part drainage platform includes a plurality of openings therethrough.

\* \* \* \* \*